United States Patent [19]

Wiget

[11] Patent Number: 5,539,289
[45] Date of Patent: Jul. 23, 1996

[54] ULTRASONIC DETECTION DEVICE, NOTABLY FOR AN AUTOMATICALLY CONTROLLED WINDSCREEN CLEANING SYSTEM

[75] Inventor: Fridolin Wiget, Neuchâtel, Switzerland

[73] Assignee: Asulab S.A., Bienne, Switzerland

[21] Appl. No.: 248,377

[22] Filed: May 24, 1994

[30] Foreign Application Priority Data

May 24, 1993 [EP] European Pat. Off. .............. 93108345
Oct. 25, 1993 [FR] France .................................. 93 12682

[51] Int. Cl.⁶ .................................................. B60S 1/08
[52] U.S. Cl. ....................................... 318/483; 318/DIG. 2
[58] Field of Search .................................... 318/443–446,
318/456, 458, 460, 483, DIG. 2

[56] References Cited

U.S. PATENT DOCUMENTS

| | | | |
|---|---|---|---|
| 4,542,325 | 9/1985 | Kobayashi et al. | 318/483 |
| 4,705,998 | 11/1987 | Millerd et al. | |
| 5,140,233 | 8/1992 | Wallrafen | 318/264 |
| 5,203,207 | 4/1993 | Sugiyama | 73/170.17 |
| 5,266,873 | 11/1993 | Arditi et al. | 318/483 |

FOREIGN PATENT DOCUMENTS

| | | |
|---|---|---|
| 0115338 | 8/1984 | European Pat. Off. . |
| 0512653 | 11/1992 | European Pat. Off. . |
| 4033975 | 5/1991 | Germany . |

*Primary Examiner*—Brian Sircus

[57] ABSTRACT

An ultrasonic detection device having a transducer (10) for emitting and receiving ultrasonic pulses through a windshield, and producing an echo signal (40,50) representative of the reflected pulses. The detection device also includes an amplifier (23) for amplifying the echo signals (40,50) by a selectable gain, an integrating circuit (26) for integrating each of the echo signals (40,50) during a selected time period (62,63) so as to produce an integral value, amplifier control circuitry (27,28) measuring the integral value and selecting the gain of the amplifier so as to maintain the integral value at a steady-state value, and the temporal deviation of the integral value from the steady-state value is measured to determine if it is greater than a predetermined threshold value. The invention may be used to detect water on a windscreen and to control the operation of a windscreen cleaning system.

10 Claims, 5 Drawing Sheets

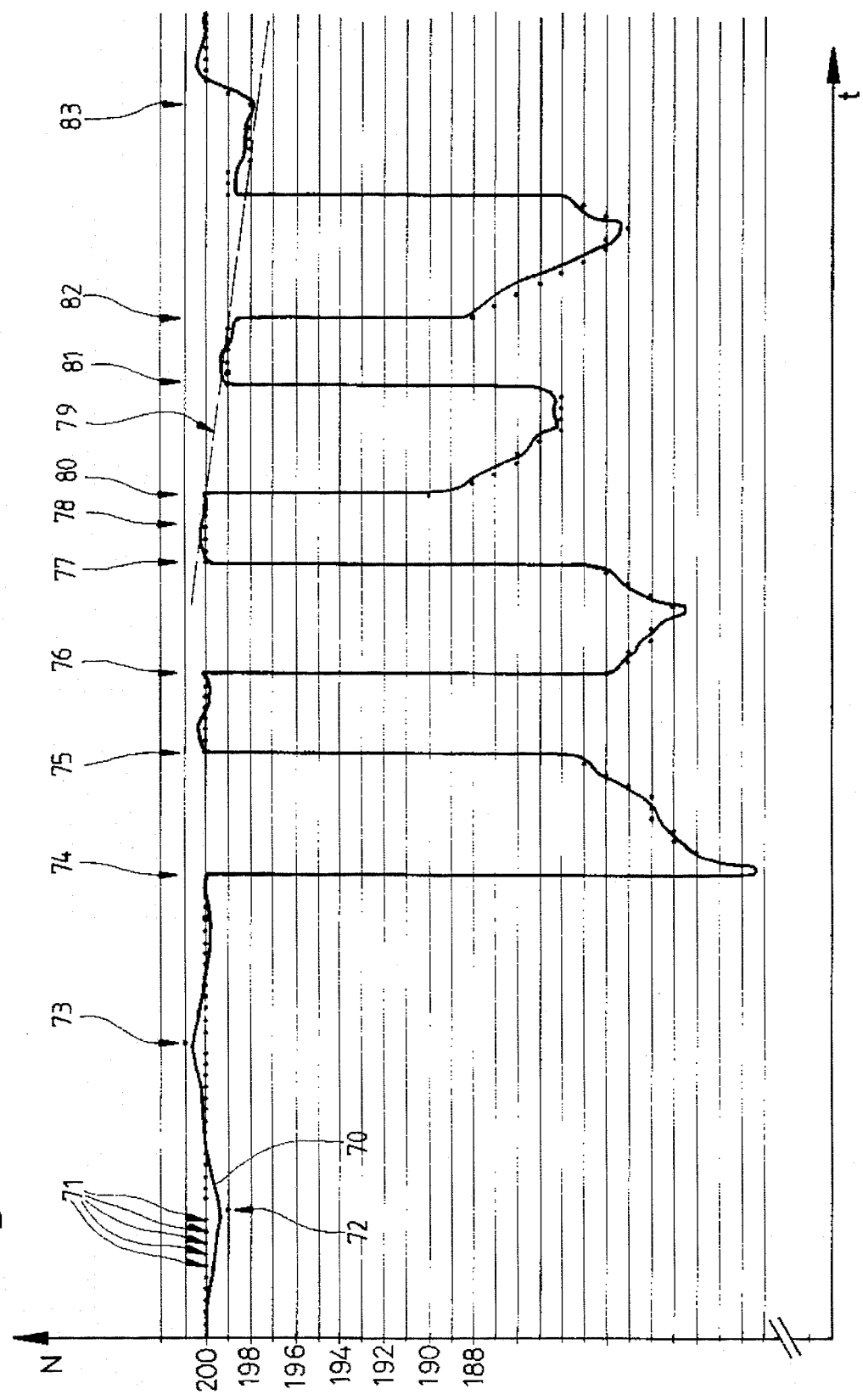

ULTRASONIC DETECTION DEVICE, NOTABLY FOR AN AUTOMATICALLY CONTROLLED WINDSCREEN CLEANING SYSTEM

This invention relates generally to ultrasonic detection devices, and in particular to ultrasonic detection devices for detecting the presence of foreign bodies such as water on a window. The ultrasonic detection device is suitable for use with an automatically controlled windscreen cleaning system, and it will be convenient to hereinafter disclose the invention in relation to that exemplary application. It is to be appreciated, however, that the invention is not limited to that application.

In recent years, various types of automatically controlled cleaning systems which operate on the basis of ultrasonic detection of water on a surface have been proposed.

One existing system, installed on the interior surface of the windscreen of a motor vehicle, comprises a transducer which emits an ultrasonic pulse and receives and processes the reflected pulses resulting therefrom. During operation, the ultrasonic pulse propogates within the thickness of the windscreen and undergoes multiple internal reflections between the windscreen's interior and exterior surfaces.

The amplitude of these reflections decays at a rate dependant upon the presence or absence of water on the windscreen. If the exterior surface of the windscreen is free from water at the location where the measurement is made, the rate of decay of the amplitude of these internal reflections is lower than if there is water present on the exterior surface of the windscreen. By measuring the amplitude of the reflected pulses detected by the transducer at a known time after the emission of the ultrasonic pulse, and comparing this amplitude with a predetermined reference voltage, it is possible to determine whether or not there is water on the exterior surface of the windscreen and so activate the windscreen wipers.

In practice though, it has been found that this approach is unsuitable for providing a reliable indication of the presence or absence of water on a windscreen. One problem associated with this device is that spurious signals, which may result, for example, from changes in the orientation or coupling of the transducer or the impact of objects on the windscreen, are liable to effect the amplitude of certain reflected pulses.

Another problem associated with this device is the difficulty in maintaining the reference voltage at its predetermined value, which voltage can vary or drift due to variation in the ambient temperature. The magnitude of the emitted ultrasonic pulse and the rate of decay of the detected reflected pulses, as measured by the electronic circuitry which processes these reflected pulses, is also effected by the temperature of this processing circuitry. Further, the rate at which the amplitude of the reflected pulses decays is also effected by the temperature of the material through which the pulses pass.

The above-described system is therefore prone to a number of different sources of error which cause an incorrect indication of the presence of water or other foreign body on a windscreen and thus the unnecessary activation of the windscreen wipers.

It is an object of the present invention to provide an ultrasonic detection device which ameliorates or overcomes the disadvantages of the prior art.

With that object in mind, the present invention provides an ultrasonic detection device for detecting the presence of foreign bodies such as water on a window, comprising transducer means for emitting a sequence of ultrasonic pulses propogating within the thickness of said window and receiving a series of reflected pulses resulting from each said ultrasonic pulse, the reflected pulses in each said series having an amplitude which decreases in time at a rate which varies as a function of the presence of said foreign bodies on said window, said transducer means producing an echo signal representative of each said series of reflected pulses, characterised in that it further comprises amplifier means for amplifying said echo signals by a selectable gain, integration means for integrating each said echo signals during a selected time period so as to produce an integral value, amplifier control means for measuring said integral value and selecting said gain so as to maintain said integral value at a steady-state value, and means for measuring the temporal deviation of said integral value from said steady-state value and determining if said temporal deviation is greater than a predetermined threshold value.

By integrating a portion of the echo signals and maintaining the steady-state value of this integrated signal constant, whilst measuring the temporal deviation from this steady-state value, an ultrasonic detection device is provided which detects the presence of water on a windscreen but which minimizes the effects of spurious noise and temperature variations and which avoids the difficulties associated with the use of a reference voltage.

The following description refers in more detail to the various features of the present invention. To facilitate an understanding of the invention, reference is made in the description to the accompanying drawings where the ultrasonic detection device is illustrated in a preferred embodiment. It is to be understood that the ultrasonic detection device of the present invention is not limited to the preferred embodiment as illustrated in the drawings.

Figure 1:
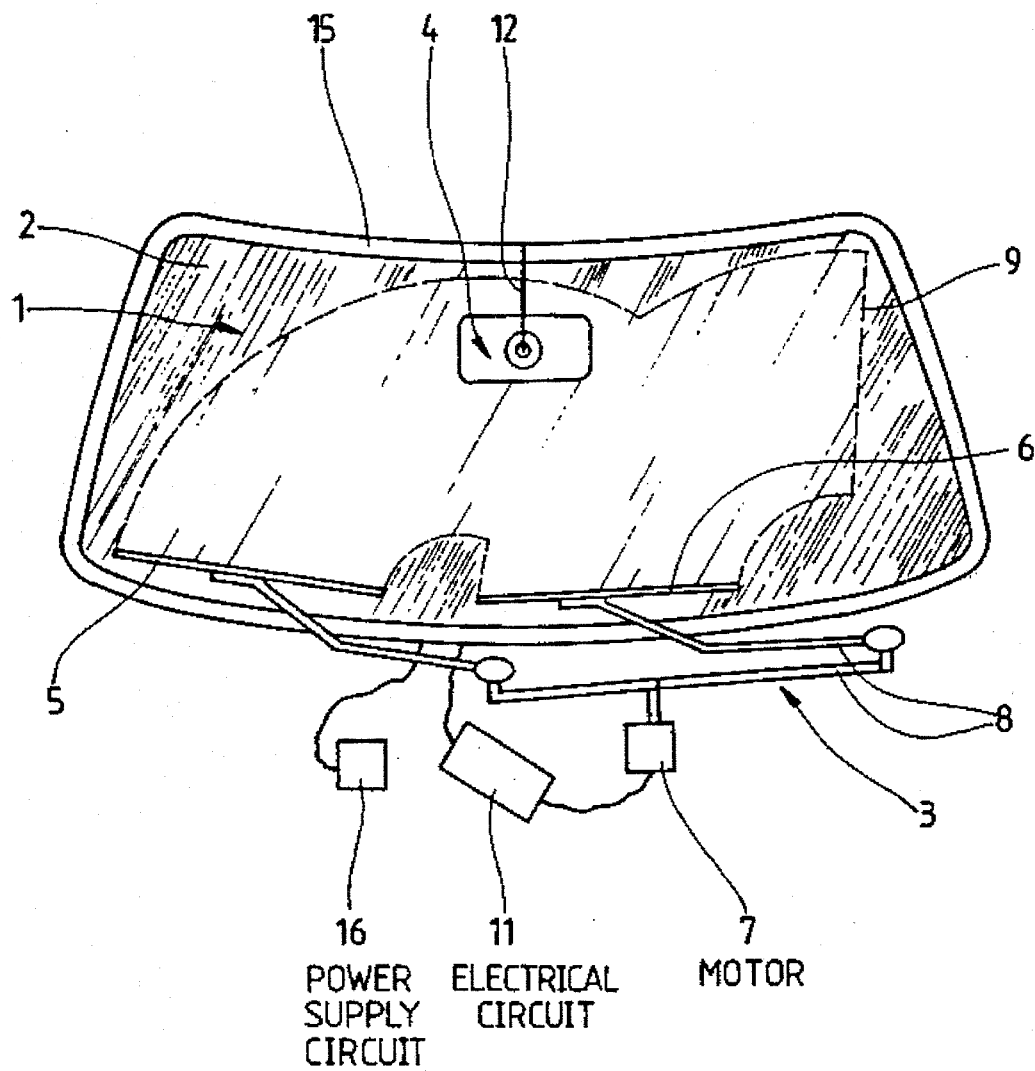
FIG. 1 is a partially diagrammatic plan view of a motor vehicle provided with an automatically controlled cleaning system having an ultrasonic detection device according to the present invention.

Referring initially to FIG. 1, there is shown a plan view of a windscreen 1 of a motor vehicle fitted with an automatically controlled cleaning system having an ultrasonic detection device according to the present invention. The cleaning system is designed to remove the presence of foreign bodies deposited on the exterior surface 2 of the windscreen 1. In this example, the term "foreign bodies" is intended to refer to an element such as water, snow, mud, etc. which may be deposited on the windscreen 1 and is able to enter the driver's field of vision.

The cleaning system comprises a windscreen wiper assembly 3 and an ultrasonic detection device 4 for detecting the presence of foreign bodies on the windscreen. The windscreen wiper asssembly 3 comprises two blades 5 and 6 driven by a motor 7 via a rod assembly 8. The blades 5 and 6 are capable of travelling over the exterior surface 2 of the windscreen 1 in an alternate arc-like movement, thereby defining a predetermined area 9, delimited by broken lines, representing the minimum field of vision which the driver needs in order drive the vehicle. This assembly is well known and will not be described in further detail.

The ultrasonic detection device 4 comprises basically a transducer 10 and an associated electrical circuit 11. The transducer 10 is fixed to the interior surface of the windscreen 1 and electrically connected to the circuit 11 via a coaxial cable 12 which passes along the seal 15 of the windscreen 1. A power supply circuit 16, conveniently the main battery of the vehicle, is also connected to the circuit 11. The motor 7 is connected to the circuit 11 and is caused to drive the wiper blades 5 and 6 across the exterior surface 2 of the windscreen 1 when the circuit 11 indicates the presence of water or another foreign body on its exterior surface 2. The circuit 11 may conveniently be realised in an integrated form. The circuit 11 may thus be conveniently affixed to the transducer 10 so as to provide a single assembly.

Figure 2:
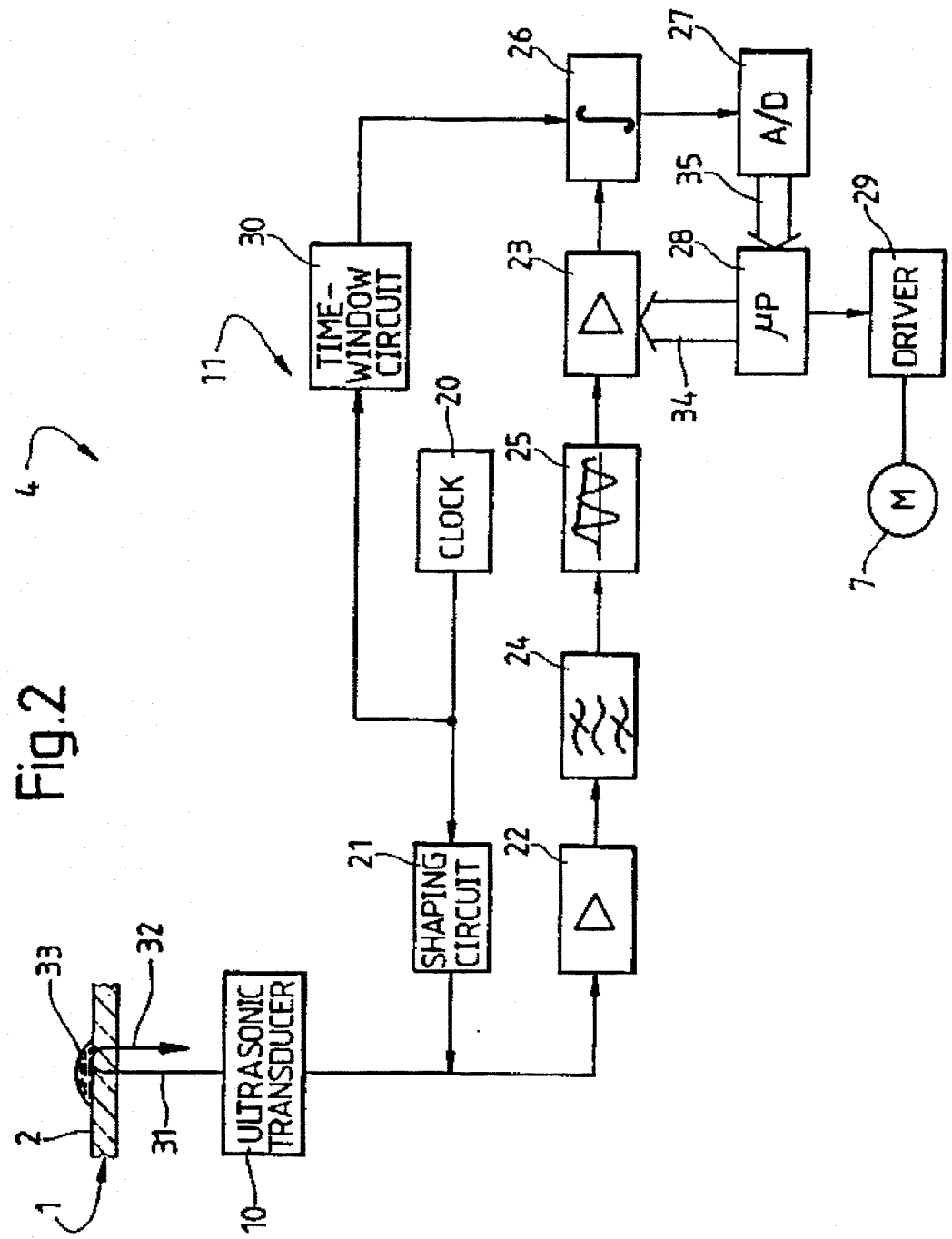
FIG. 2 is an electrical circuit block diagram of an embodiment of an ultrasonic detection device according to the present invention.

Referring now to FIG. 2, there is shown generally the ultrasonic detection device 4 and the motor 7 of FIG. 1. The ultrasonic detection device 4 comprises the ultrasonic transducer 10, a clock circuit 20, a shaping circuit 21, amplifier circuits 22 and 23, a band-pass filter 24, an envelope detector 25, an integration circuit 26, an analog/digital converter 27, a microprocessor 28, a driver circuit 29 and a time-window circuit 30.

The ultrasonic transducer 10 may be of any desired design and is used to emit a sequence of incident ultrasonic pulses, each propogating within the thickness of the windscreen 1, and to receive a series of reflected pulses resulting from the propogation of each emitted pulse. The transducer 10 may be in the form of a disc made of a piezoelectric ceramic such as lead titanite, the two opposing faces of which may each be covered by an electrode for connection to the circuit 11. The transducer 10 is mounted to the interior surface of the windscreen 1 so as to achieve good coupling therebetween and minimize extraneous reflections at the mounting interface.

The clock circuit 20 transmits impulses to the shaping circuit 21, each impulse having a duration of between 50 to 200 nanoseconds. The amplitude of these impulses is limited by the shaping circuit 21 to a fixed value, which may be 10 volts. The impulses from the shaping circuit 21 are applied across the electrodes of the transducer 10 which, in response to this excitation, creates a sequence of incident ultrasonic pulses 31. These pulses may have any convenient repetition frequency, which may be, for example, in the order of 2.56 kHz. These pulses propogate within the thickness of the windscreen and undergo a large number of internal reflections between the interior and exterior surfaces of the windscreen.

The ratio of the reflected to transmitted energy of the pulses during these internal reflections within the windscreen varies depending upon the materials forming the interface at which the pulses are reflected/transmitted. If the interface is between the exterior surface of the windscreen and air, a greater proportion of the pulse is reflected back towards the transducer 10 than if the interface is between the exterior surface of the windscreen and water. Thus, the amplitude of the reflected pulses 32 detected by the transducer 10 after the emission of each ultrasonic pulse 31 will decay at a rate dependant on the presence or absence of a foreign body such as water on the exterior surface 2 of the windscreen 1.

The electrical "echo" signal created between the electrodes of the transducer 10, resulting from the detection of the series of reflected pulses following each emitted pulse 31, is supplied to the amplifier 22 for processing by the rest of the circuit 11. Each echo signal thus produced is in of the order of 5 millivolts peak-peak. The amplifier 22 has an gain of typically 40 decibels and transforms the echo signal from a peak-peak voltage of 5 millivolts to a peak-peak voltage of 500 millivolts. The amplifier 22 is of a suitable design to withstand without damage the voltage present at the output of the shaping circuit 21. The filter 24 has a pass-band of 3 to 5 MHz and removes extraneous noise from the echo signals.

Figure 3:
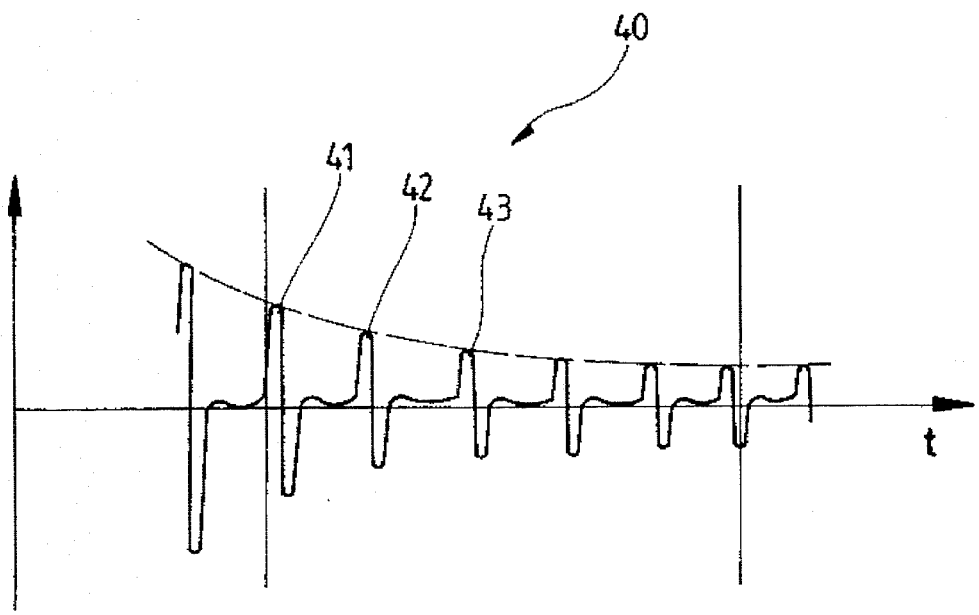
FIG. 3 is a diagrammatical representation of a typical echo signal produced by the ultrasonic detection device of FIG. 2 in the absence of water on the exterior surface of a windscreen.
Figure 4:
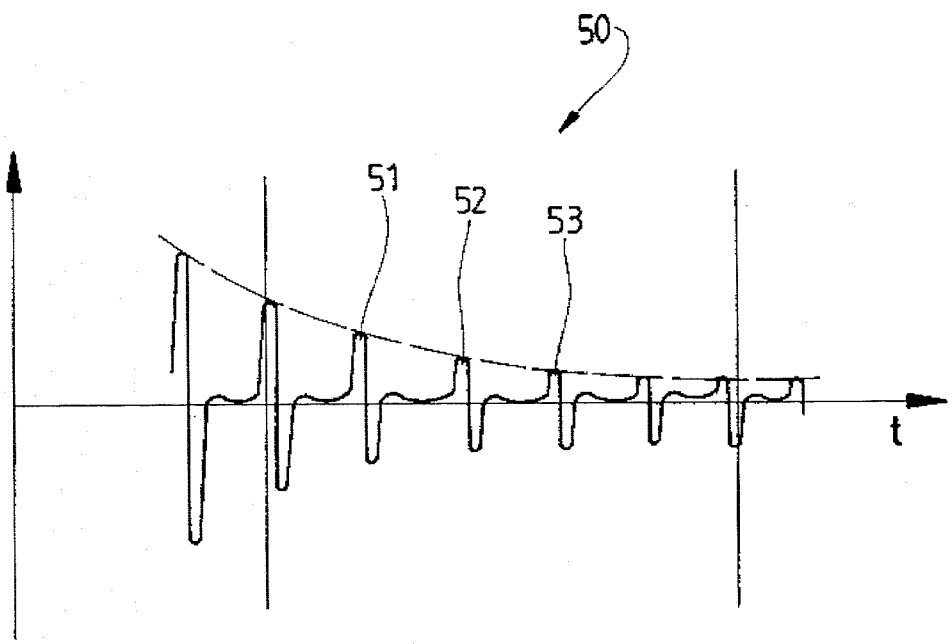
FIG. 4 is a diagrammatical representation of a typical echo signal produced by the ultrasonic detection device of FIG. 2 in the presence of water on the exterior surface of a windscreen.

FIG. 3 shows a typical echo signal 40 for a windscreen/air interface, as measured at the output of the band-pass filter 24, having pulses such as those referenced 41, 42 and 43. FIG. 4 shows a typical echo signal 50 for a windscreen/water interface, also measured a% %he output of the band-pass filter 24, having pulses such as those referenced 51, 52 and 53. As can be seen from these two figures, the amplitude of the pulses of each echo signal is more rapidly attenuated if some water 33 is present on the exterior surface 2 of the windscreen 1, than if the water 33 is absent.

Rather than determining the rate of decay of each echo signal by directly measuring the amplitude of one or more of its pulses at a fixed time after the emission of an incident ultrasonic pulse 31, consecutive echo signals which are received from the transponder 10 are integrated, the steady-state value of this integral being kept constant, whilst the temporal deviation from this steady-state value is measured. This procedure will now be explained.

Figure 5:
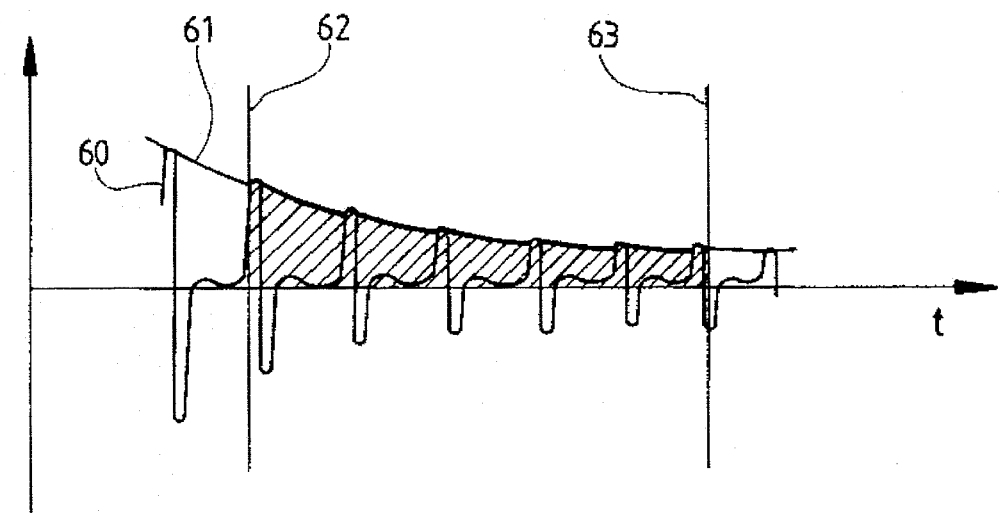
FIG. 5 is a diagrammatical representation of the echo signal of FIG. 3 showing its integration during a selected period of time.

The output of the band-pass filter 24 is connected to the envelope detector 25 which, whilst not essential to the invention, smooths each echo signal by removing any alternating component and increases the accuracy of the integration to be performed. FIG. 5 shows an echo signal 60, as measured at the output of the band-pass filter 24, having an envelope 61 which is detected by the envelope detector 25. The envelope signal 61 thus detected is then amplified by the amplifier 23 according to a gain value supplied by the microprocessor 28 via an 8-bit data bus 34.

The amplified envelope signal 61 is then supplied to the integration circuit 26, this latter also being connected to the output of the clock circuit 20 via the delay circuit 30. The delay circuit 30 enables the integration circuit 30 to integrate the envelope signal 61 within a selected time window. This time window, which may have a duration of less than 10 μsecs, is open with a delay adjustable between 2 and 50 μsecs after each impulse is supplied to the shaping circuit 21. Typically, the time window may be open from 18 to 23 μsecs after each such impulse. To achieve this delay, the delay circuit 30 counts the pulses from the clock circuit 20 following the emission of each ultrasonic pulse 31 by the transducer 10. The instants at which this time window is opened and closed are referenced 62 and 63 respectively in FIG. 5.

Figure 6:
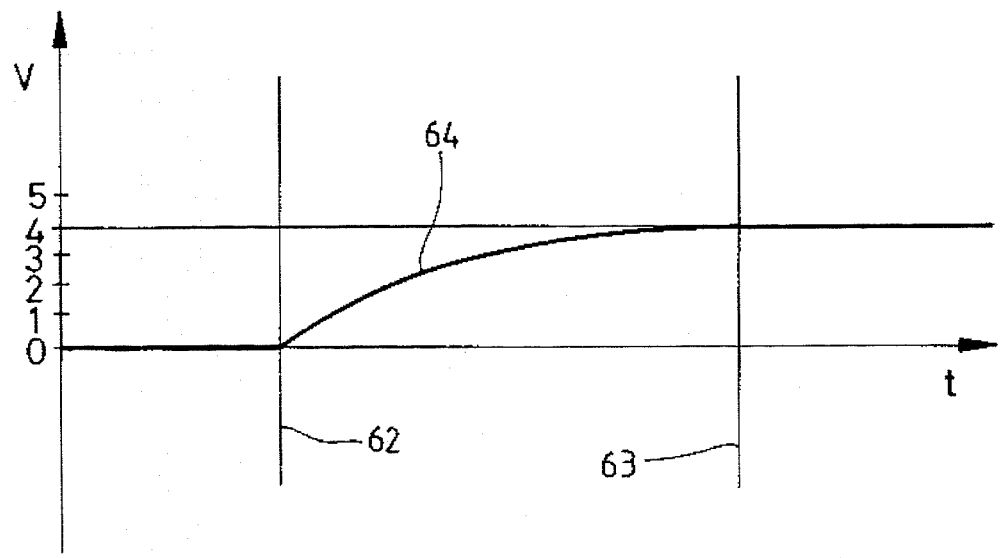
FIG. 6 is a diagrammatical representation of the integrated signal of FIG. 5; and, FIG. 7 is diagrammatical representation of the integrated signal resulting from the emission of a sequence of ultrasonic pulses by the ultrasonic detection device of FIG. 2.

FIG. 6 shows a graphical representation of the voltage 64 present at the output of the integration circuit 26 as a function of time. As can be seen from this figure, the output of the integration circuit 26 is set to zero volts following the emission of each ultrasonic pulse 31 by the transducer 10. At the opening 62 of the time window defined by the delay circuit 30, the voltage 64 increases as a function of the integral of the envelope signal 61. At the closing 63 of the time window, the envelope signal 61 ceases to be integrated and the voltage 64 remains constant thereafter at a value representative of the shaded region in FIG. 5, until is it reset to zero again.

The analog/digital converter 27 converts the voltage at the output of the integration circuit 26 after the closing 63 of each time window, into a corresponding digital value which is supplied to the microprocessor 28 via an 8-bit data bus 35. The output of the integration circuit 26 thus need only be read once each echo signal, or at a rate, in this example, of 2.56 kHz. In order to further minimize spurious readings, the microprocessor 28 may store a number of digital values and then calculate the average of these values. Conveniently, the digital values stored may be consecutive. The number of values used to calculate this average may vary. In the exemplary embodiment shown in FIG. 2, 256 consecutive values may be averaged, so that with an incident ultrasonic pulse having a repetition frequency of 2.56 kHz, an averaged digital value is calculated at the rate of 10 per second.

Based upon each averaged digital value, the microprocessor 28 adjusts the gain value provided to the amplifier 23 in order to maintain the voltage at the output of the integration circuit 26, after the time 63, at a steady-state value. As shown in FIG. 6, this steady-state value is preferrably a substantial proportion of the full-scale input voltage of the analog/digital converter 27 so as to maximize the resolution of reading. The full-scale input voltage of the analog/digital converter 27 may be, for example, 5 volts whilst the steady-state value of the integration circuit output may be 4 volts.

FIG. 7 shows a graphical representation of the analog signal at the output of the integration circuit 26, as referenced by the continuous line 70, and of the averaged digital values calculated by the microprocessor 28, as referenced by the points 71. The analog/digital converter 27 is set so that a full-scale input voltage corresponds to a digital value of $2^8-1=255$ (the bus 35 having 8 bits), and a input voltage of zero corresponds to a digital value of 0. The steady state value of the integral signal 64, read at a time following the closing 63 of the time window during which each echo signal is integrated, may thus correspond to a digital value, for example, of 200.

Under conditions whereby water or another foreign body is not present on the exterior surface 2 of the windscreen 1 and whereby the ambient temperature is constant, the output 70 of the analog/digital converter 26 and the corresponding average digital values 71 calculated by the microcomputer 28 remain invariant.

If the ambient temperature of the windscreen 1 or the operating characteristics of the processing circuitry 11 alter, the analog signal 70 and its corresponding averaged digital value 71 may temporarily deviate from their steady-state values. Such a situation is represented in FIG. 7 by the deviations at the times 72 and 73. Due to the thermal inertia of the windscreen 1 and/or the normally gradual drift, if any, in the operating characteristics of the processing circuitry 11, the deviations 72 and 73 occur relatively slowly. The deviation between consecutive averaged digital values calculated by the microprocessor 28 from its steady-state value of 200, may be in the order of 0 to 2 only. The microprocessor 28 is adapted to adjust the gain value supplied to the amplifier circuit 23 by a fixed amount only each time a new averaged digital value 71 is calculated. This fixed amount, which may correspond to the least-significant-bit of the 8-bit gain value, is such as to substantially or completely compensate for small deviations and enables the averaged digital values 71 to be controlled around the steady-state value of 200.

However, the introduction of a drop or drops of water 33, for example, onto the exterior surface 2 of the windscreen 1, causes an substantial and immediate reduction in the amplitude of the pulses in the echo signals from the transducer 10 and hence a sharp drop between consecutive average digital values, as represented by the deviation at the time 74. This deviation, from the steady-state value of 200, may be in the order of between 5 to 150, depending upon the quantity of water present at the location where the measurement is made.

The microprocessor 28 sends a logically high signal to the driver circuit 29 when two consecutive averaged digital values differ by more than a predefined threshold limit, for example, of 4. In response to this logically high signal, the driver circuit 29 causes power to be supplied to the motor 7, which thus drives the wiper blades 5 and 6 across the exterior surface 2 of the windscreen 1.

In order that the ultrasonic detection device is less sensitive to a change in gain of the amplifier, the microprocessor 28 may be adapted to compensate for any deviation between successive averaged digital values resulting from a gain change of the amplifier 23. For example, if the gain of the amplifier 23 is modified between the calculation of two successive averaged digital values, the microprocessor 28 may modify the first averaged digital value by multiplying it by the ratio of the new gain to the previous gain. As a result of this, a comparison between the second averaged digital value and this first modified averaged digital value enables the measurement of the deviation between these values, whilst the component which results from a change in the gain of the amplifier 23 may be ignored.

Having thus detected the presence of water or another foreign body on the windscreen, the microprocessor 28 ceases to adjust the gain value supplied to the amplifier circuit 23. At certain time 75 after the detection of the deviation at time 74, the wiper blades 5 and 6 wipe the water away from the measurement location. At this time 75, the averaged digital values 71 return to a value around their steady-state value of 200.

At time 76, another quantity of water is introduced onto the windscreen. The microprocessor 28 detects that the variation between consecutive averaged digital values is more than the threshold limit of 4, and consequently continues to operate the wiper blades 5 and 6. Similarly, at time 77, the water is once again wiped away from the measurement location and the averaged digital values 71 return to a value around their steady-state value.

By comparing each averaged digital value 71 with the preceding averaged digital value, a ultrasonic detection device of the present invention is able to accurately detect the introduction of foreign bodies onto a window in spite of other time-varying factors, such as changes in the ambient temperature. At the time 78, a gradual change in the temperature of the windscreen 1, for example, is represented. This change may alter the rate at which the amplitude of the pulses in each echo signal decays, and hence effect the steady-state value of the averaged digital values as calculated by the microprocessor 28. This "steady-state" value may therefore drift with time, as represented by the line 79. However, the detection of a difference between consecutive averaged digital values at the times 80 and 81 enables the microprocessor 28 to continue to operate the wiper assembly 3 in order to remove the water from the windscreen 1.

At a time 82, the water which resulted in the deviation at the time 81 is cleaned from the windscreen 1 and the averaged digital values return to their "steady-state" value 79. After a certain predetermined time, which may correspond to the calculation of 20 averaged digital values (i.e. 2 seconds), if no deviation greater than the allowable threshold limit of 4 is detected, the microprocessor 28 recommences adjusting the gain value supplied to the amplifier 23. As can be seen at time 83, the averaged digital values no longer drift as a function of the change in ambient temperature of the windscreen, but return to a value around their true steady-state value of 200.

Finally, it is to be understood that various modifications and/or additions may be made to the ultrasonic detection device of the present invention without departing from the ambit of the present invention as defined in the claims appended hereto.

For example, an ultrasonic detection device according to the present invention may be envisaged by inversing the positions of the amplifier 23 and the integrator 26 with respect to the positions of these items as shown in FIG. 2. Thus, the echo signals of the transducer 10 may firstly be integrated in a selected temporal window, and subsequently amplified by the amplifier 23, the gain of the amplifier 23 being modified so as to maintain the integral value at the output of the integrator circuit 26 at a steady-state value.

I claim:

1. Ultrasonic detection device for detecting the presence of foreign bodies such as water on a window, comprising:

transducer means (10) for emitting a sequence of ultrasonic pulses (31) propogating within the thickness of said window (1) and receiving a series of reflected pulses (32) resulting from each said ultrasonic pulse, the reflected pulses in each said series having an amplitude which decreases in time at a rate which varies as a function of the presence of said foreign bodies (33) on said window, said transducer means (10) producing an echo signal (40,50) representative of each said series of reflected pulses, characterised in that it further comprises:

amplifier means (23) for amplifying said echo signals (40,50) by a selectable gain, integration means (26) for integrating each said echo signal (40,50) during a selected time period (62,63) so as to produce an integral value, amplifier control means (27,28) for measuring said integral value and selecting said gain so as to maintain said integral value at a steady-state value, and means (29) for measuring the temporal deviation of said integral value from said steady-state value and determining if said temporal deviation is greater than a predetermined threshold value.

2. Ultrasonic detection device according to claim 1, characterised in that said amplifier control means (27,28) comprises means (28) for storing and averaging the integral values of a predetermined number of echo signals (40,50), said gain being selected according to the average of said integrated values.

3. Ultrasonic detection device according to claim 1, characterised in that:

said predetermined number of echo signals are consecutive.

4. Ultrasonic detection device according to any one of the preceding claims, characterised in that it further comprises:

an envelope detector (25) for receiving said echo signals (40,50) and supplying the envelope (61) of said echo signals to said integration means (26) for integration.

5. Ultrasonic detection device according to any one of claims 1 to 3, characterised in that it further comprises:

an envelope detector (25) for receiving said echo signals (40,50) and supplying the envelope (61) of said echo signals to said amplifier means (26) for amplification.

6. Ultrasonic detection device according to claim 1, characterised in that:

said amplifier control means (27,28) comprises an analog/digital converter (27) for producing a digital value representative of said integral value, and means (28) for averaging the digital values corresponding to a predetermined number of echo signals.

7. Ultrasonic detection device according to claim 6, characterised in that:

said deviation measuring means (29) comprises means for measuring the difference between consecutive ones of said averaged digital values and determining if said difference is greater than a predetermined digital quantity.

8. Ultrasonic detection device according to claim 7, characterised in that:

said deviation measuring means (29) further comprise multiplication means for multiplying each averaged digital value by a value representative of the relation between the selected gain for that averaged digital value and the selected gain for the successive averaged digital value, said multiplication means enabling the measurement of the deviation between said multiplied averaged digital value and said successive averaged digital value.

9. Automatically controlled window cleaning system having an ultrasonic detection device according to claim 1, characterised in that it further comprises:

cleaning means (3) for cleaning a defined area on the exterior surface of said window, driving means (7) for driving said cleaning means (3), said driving means (7) causing the operation of said cleaning means (3) in response to an indication of the presence of said foreign body on the exterior surface of said window.

10. Automatically controlled window cleaning system according to claim 9, characterised in that:

said window is a motor vehicle windscreen (1), said cleaning means comprising a windscreen wiper assembly (3) for cleaning the exterior surface (2) of said windscreen (1).

* * * * *